Nov. 11, 1947. G. D. HULST, JR 2,430,570
RADIO NAVIGATION SYSTEM
Filed Oct. 27, 1944 6 Sheets-Sheet 1

INVENTOR.
George D. Hulst, Jr.
BY
ATTORNEY

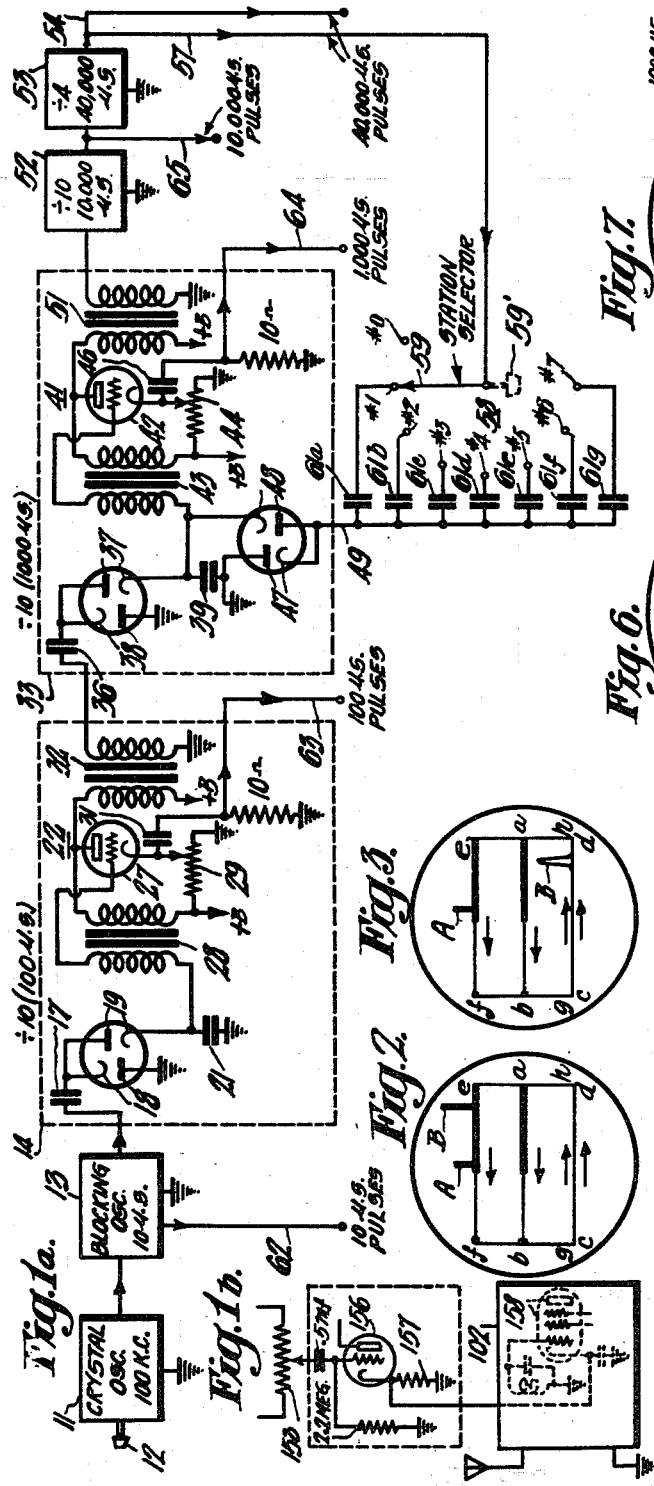

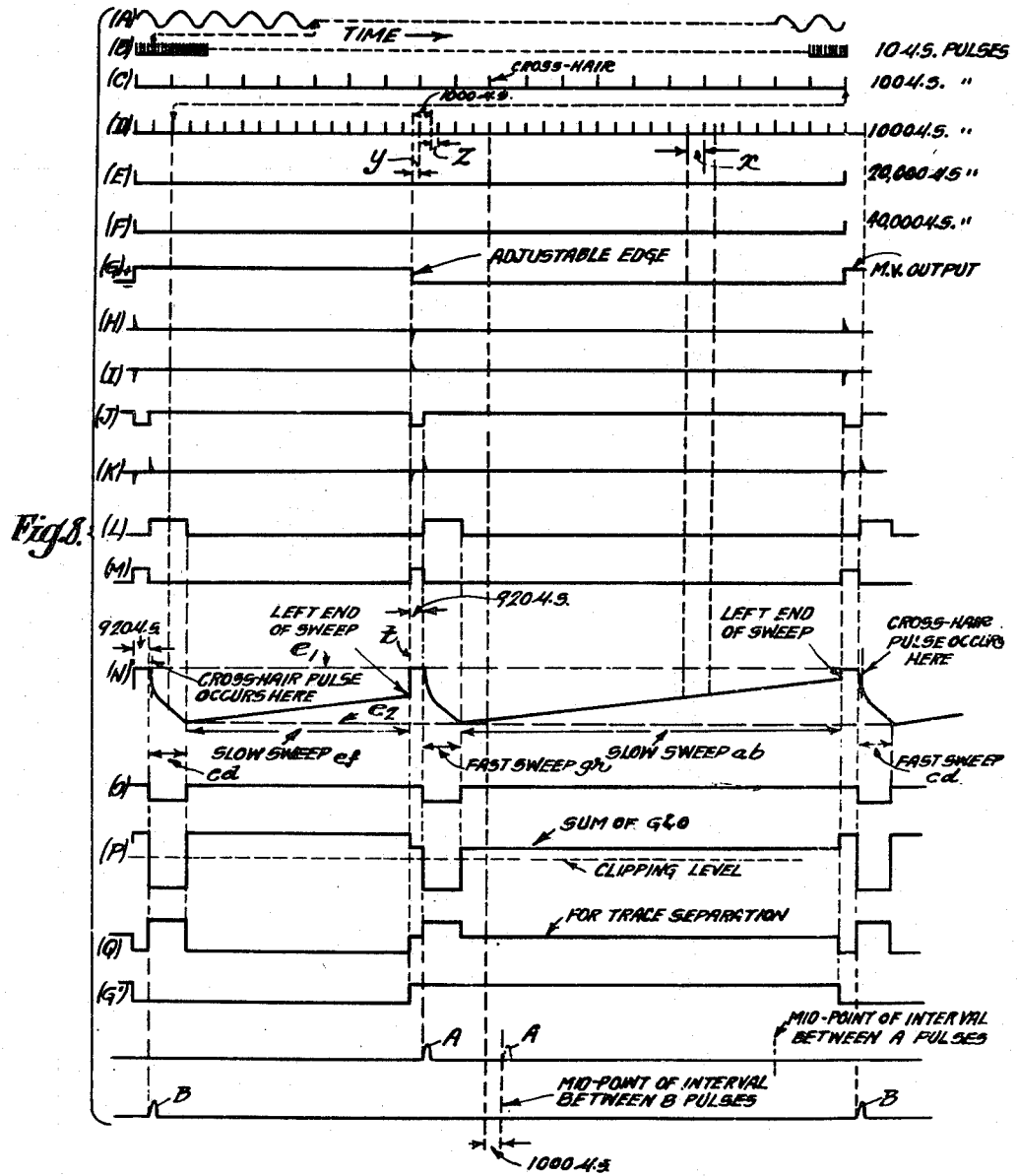

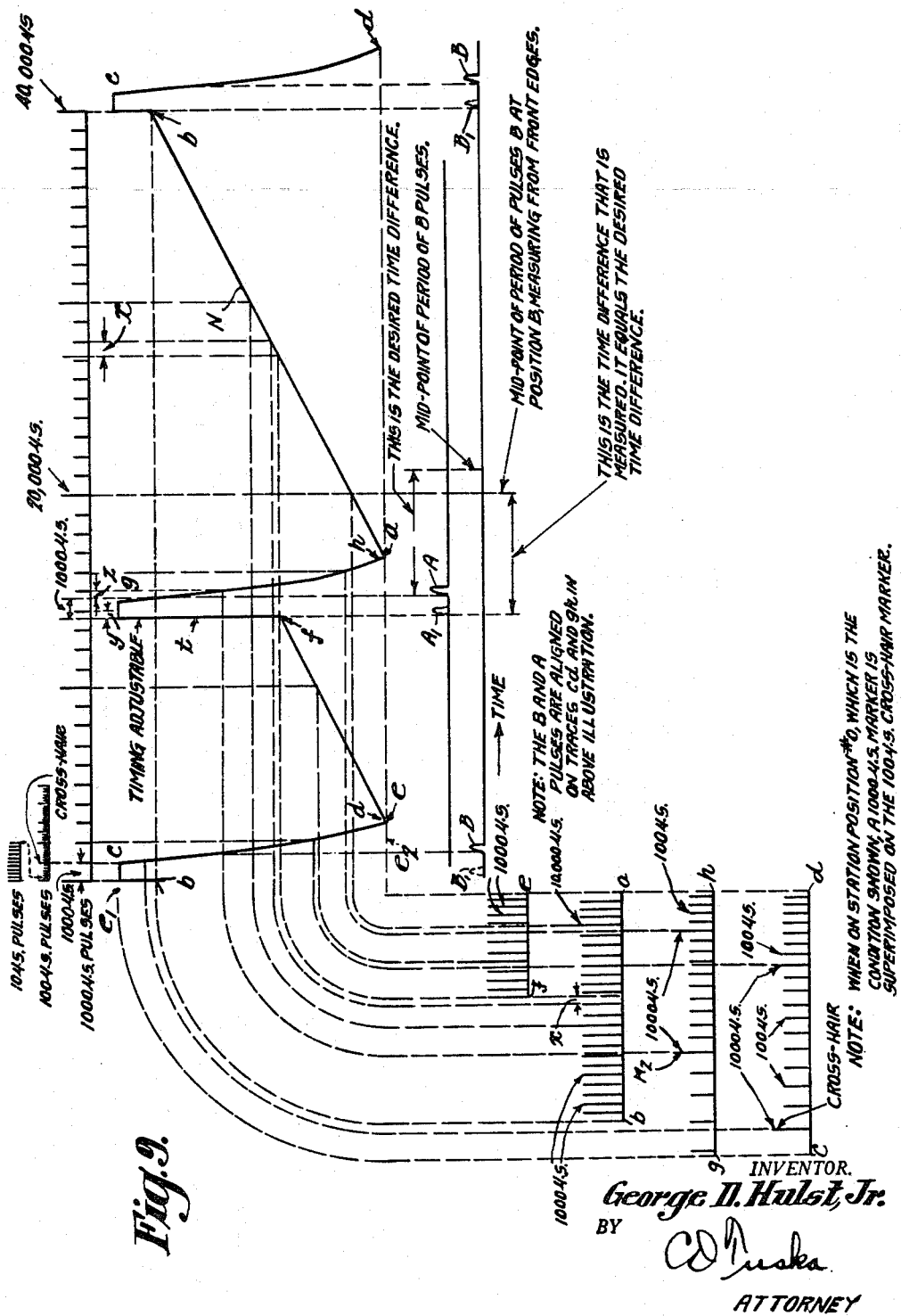

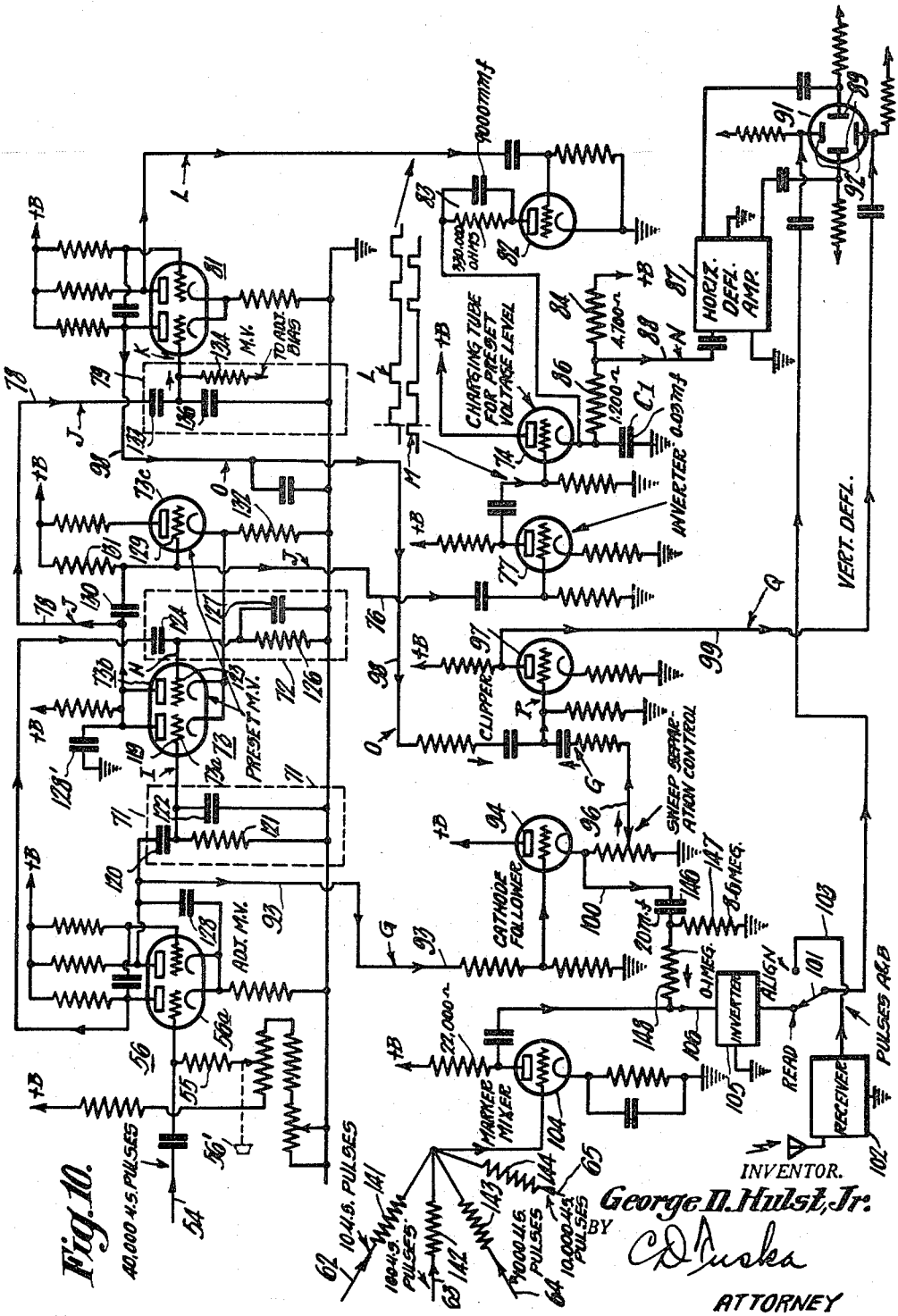

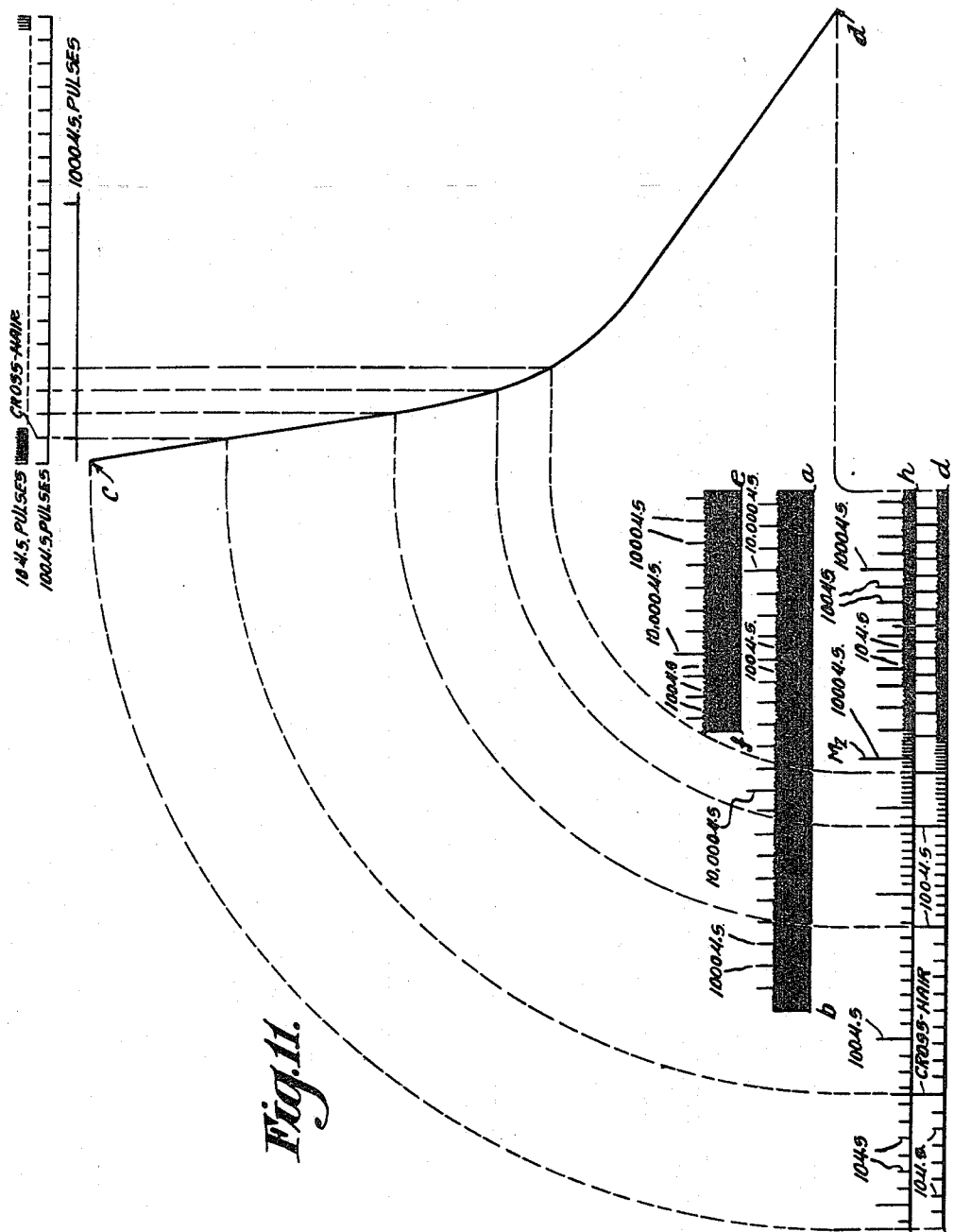

Patented Nov. 11, 1947

2,430,570

UNITED STATES PATENT OFFICE 2,430,570

RADIO NAVIGATION SYSTEM

George D. Hulst, Jr., Upper Montclair, N. J., assignor to Radio Corporation of America, a corporation of Delaware Application October 27, 1944, Serial No. 560,648

25 Claims. (Cl. 250—11)

My invention relates to radio navigation systems and particularly to systems of the type utilizing the time difference in the propagation of radio pulses from synchronized ground stations to a receiver on an aircraft or a ship.

Navigation systems of this type employ pairs of synchronized ground stations that transmit radio pulses having at the instant of radiation a fixed time relation to each other. Each pair of ground stations preferably transmits pulses at its individual assigned repetition rate for the purpose of station selection. The pulses are radiated to receiving equipment located on the aircraft or ship whose position is to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having "time difference" lines printed thereon for the several pairs of ground stations are provided for use with the navigation system.

In order to measure the time difference in the arrival of successive pulses from a pair of ground stations, the receiving apparatus produces timing marker pulses that have a known time interval between them. Also, it produces pulses having a definite time relation to the timing marker pulses for the purpose of driving or synchronizing cathode ray deflecting circuits. These deflecting circuits produce cathode ray sweep traces on which the timing marker pulses and/or the received ground station pulses appear.

For the purpose of selecting a particular pair of ground stations, the operator selects a particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode ray sweep or trace whereas those received from the other pairs of ground stations will move rapidly along the same trace.

In operation, the pulses from the two transmitter stations of a selected pair of stations (which pulses will be referred to as the A and B pulses, respectively) are made to appear on two parallel cathode ray traces and are brought into alignment or coincidence by moving one of them along its cathode ray sweep trace, this being done by adjusting the start of said cathode ray sweep. It is then possible to measure the time displacement of the sweep required for pulse alignment, this also being the time difference in the arrival of the A and B pulses. This is done by counting certain timing markers appearing on the cathode ray traces whereby the desired time difference is obtained. The present application describes an improved method of any system for thus determining the desired time difference.

An object of the present invention is to provide an improved method of and means for determining the time difference between electrical pulses.

A further object of the invention is to provide an improved radio navigation system of the type utilizing the propagation of radio pulses from pairs of synchronized ground stations.

A further object of the invention is to provide an improved method of and means for expanding a cathode ray trace on which timing marks appear so that a fractional time interval to be determined is indicated by timing marks on the expanded portion of the trace.

A still further object of the invention is to provide in a radio navigation system an improved method of and means for utilizing parallel cathode-ray traces and a cross-hair marking to determine precisely the time difference between successive received radio pulses.

Other objects, features and advantages of the invention will be apparent from the following description taken in connection with the accompanying drawing in which Figure 1 is a block and circuit diagram of navigation receiving apparatus designed in accordance with one embodiment of the invention, Figure 1a is a block and circuit diagram of the pulse generating unit shown in Fig. 1, Figure 1b is a circuit diagram of a differential gain control circuit that may be employed in the system of Fig. 1, Figure 1c is a block diagram representing one pair of ground radio transmitter stations of the navigation system which transmit A and B pulses, respectively, Figures 2 to 7, inclusive, are views of the screen end of the cathode ray indicator tube included in the apparatus of Fig. 1 showing the cathode ray sweep traces and the received pulses and timing marker pulses thereon at successive steps in the operation of finding the time interval between the received A and B pulses radiated from a pair of ground stations, Figure 8 is a group of graphs which are referred to in explaining the operation of the system shown in Fig. 1, Figure 9 is a view showing the relation of the cathode-ray traces to the horizontal deflecting wave, and Figure 10 is a circuit diagram of the wave shaping and cathode-ray deflection and control circuits included in the system of Fig. 1, and Figure 11 is an enlarged view showing the relation of the timing marks on a fast sweep trace to the deflecting wave producing it.

In the several figures similar parts and graphs have been indicated by similar reference characters.

The pulse generator unit

In Figure 1, the broken line rectangle encloses the pulse generating circuit which produces the timing marker pulses and the pulses occurring at the cathode ray deflection rate which are utilized for controlling and synchronizing the cathode ray deflection. Referring to the pulse generator enclosed in rectangle 10 and shown in detail in Fig. 1a, it comprises a crystal oscillator 11 that produces a sine wave voltage of stable frequency which in the example illustrated is 100 kilocycles per second. The frequency of the crystal oscillator output may be increased or decreased slightly by a manual adjustment as indicated at the control knob 12 for obtaining a right or left drift of a received pulse of a cathode ray sweep trace.

The crystal oscillator 11 drives a blocking oscillator 13 or the like to produce periodic pulses which, in the present example, also recur at the rate of 100 k. c. per second. The time interval between successive pulses is, therefore, 10 microseconds.

The frequency of the 10 μ. s. pulses is divided by ten by means of a suitable frequency divider 14 to produce 100 μ. s. pulses. While specific values are being given for the several frequency division steps, the invention, of course, is not limited to these particular values. It may be preferred to divide in smaller frequency steps for greater frequency stability, in which case one may use the pulse generator circuit described in application Serial No. 552,146, filed August 31, 1944, in the name of Earl Schoenfeld, and entitled Timing marker and station selection apparatus.

The frequency divider 14 may be of the counter type described in White Patent 2,113,011. The divider 14 comprises a counter circuit portion including an input capacitor 17, a pair of diodes 18 and 19, a storage capacitor 21 and a blocking oscillator portion 22. The blocking oscillator 22 comprises a vacuum tube 27, a transformer 28 coupling the plate circuit to the grid circuit and a biasing resistor 29 which is bypassed by a capacitor 31. A transformer 32 supplies the 100 μ. s. pulses from the divider 14 to a frequency divider 33.

The frequency divider 14 operates as follows: Each of the 10 μ. s. pulses of positive polarity from the oscillator 13 puts a predetermined charge on the storage capacitor 21 of comparatively large capacitance as a result of a pulse of current through the comparatively small coupling capacitor 17 and through the diode 19. At the end of this current pulse, the capacitor 17 is discharged to ground potential through the diode 18. The next 10 μ. s. pulse puts an additional current pulse into capacitor 21 to charge it to a slightly higher voltage. The tenth pulse raises the voltage of capacitor 21 sufficiently to trigger the blocking oscillator 22 whereby a pulse is produced across the transformer 28 as is well understood in the art, this pulse being applied to the divider 33 with positive polarity.

The frequency divider 33 divides the frequency by ten to produce 1000 μ. s. pulses. It includes a counter portion comprising a coupling capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46. In addition, it includes a pair of diodes 47 and 48 associated with the storage capacitor 39 for the purpose of making the divider 33 lose a count upon the application of a pulse from a conductor 49 as will be explained hereinafter.

The 1000 μ. s. pulses are supplied through a transformer to a frequency divider 52 that divides by ten to produce 10,000 μ. s. pulses. The divider 52 may be similar to the divider 14.

The 10,000 μ. s. pulses are supplied to a frequency divider 53 that divides by four to produce 40,000 μ. s. pulses. The divider 53 may be similar to the divider 14.

The 40,000 μ. s. pulses are supplied over conductor 54 to a multivibrator 56 for obtaining pulses of the desired wave shape and timing to control the cathode ray deflecting circuits.

The 40,000 μ. s. pulses are also supplied over a conductor 57 to a station selection circuit 58. As shown in Fig. 1a, the circuit 58 comprises a switch 59 operated by a knob 59' and a plurality of switch contact points 0, 1, 2, 3, etc., which are connected to the feedback conductor 49 through capacitors 61a, 61b, etc. At each switch position the 40,000 μ. s. pulses are fed back to the divider 33 through the diode 48 to subtract counts. The number of counts subtracted depends upon the capacity of the particular capacitor switched into the circuit.

Before describing the operation of the count subtracting circuit for station selection, it may be noted that the desired timing marker pulses are obtained at various points along the frequency divider circuit. In this particular example, the 10 μ. s. pulses are supplied from the blocking oscillator 13 to an output lead 62. The 100 μ. s. pulses are supplied from divider 14 to a conductor 63, the 1000 μ. s. pulses are supplied from the divider 33 to a conductor 64, and the 10,000 μ. s. pulses are supplied from the divider 52 to a conductor 65.

Count subtraction for station selection

Referring now more particularly to the feature of subtracting counts for the purpose of station selection, specific pulse repetition rates will be referred to by way of example to aid in explaining the operation.

It will be assumed that the first pair of ground stations transmit the A pulses with a repetition period of 40,000 μ. s. and transmit the B pulses with a like repetition period, that the second pair of ground stations transmit A and B pulses having a repetition period of 39,900 μ. s.; that the third pair transmits 39,800 μ. s. pulses; that the fourth pair transmits 39,700 μ. s. pulses, etc. It is apparent that for station selection at the receiving apparatus, the operator must be able to select corresponding pulse repetition periods for the output of the frequency divider 53; namely 40,000 μ. s.; 39,900 μ. s.; 39,800 μ. s.; 39,700 μ. s.; 39,600 μ. s.; etc.

It will be noted that the several repetition periods differ from each other by 100 μ. s. or by integral multiples thereof. Therefore, the desired repetition period can be obtained by shortening the 40,000 μ. s. period by 100 μ. s., by 200 μ. s., by 300 μ. s., etc. For example, to obtain the 39,900 μ. s. repetition period the station selector switch 59 is turned to the #1 switch contact point. At this switch position the 40,000 μ. s. pulses from the lead 57 are fed back through the switch 59, the capacitor 61a, and the conductor 49 to the frequency divider 33. Upon the occurrence of a 40,000 μ. s. pulse, it produces a pulse of current through the diode 48 to add a charge to the storage capacitor 39. By properly selecting the capacity value of the capacitor 61a, this added charge is made equal to the charge which is added to the capacitor 39 by a single 100 μ. s. pulse. Thus, the 40,000 μ. s. pulse causes the blocking oscillator 41 to fire one pulse earlier or 100 μ. s. sooner than it normally would whereby the desired repetition period of 39,900 μ. s. is obtained. It may be noted that the capacitor 61a corresponds to the capacitor 36 of the counter circuit, and that the diode 47 functions to bring capacitor 61a back to its original potential at the end of a pulse.

To obtain the 39,800 μ. s. repetition period, the switch 59 is turned to position #2. Now the 40,000 μ. s. pulses are applied through the capacitor 61b to the divider 33 and upon the occurrence of a 40,000 μ. s. pulse it applies a charge to the capacitor 39 through the diode 48. The capacitor 61b is given capacity a value such that this charge applied by a 40,000 μ. s. pulse is equal to the charge applied by two 100 μ. s. pulses. Thus, upon the occurrence of a 40,000 μ. s. pulse, the blocking oscillator 41 fires two pulses early or 200 μ. s. sooner than it normally would whereby the desired repetition period of 39,800 μ. s. is obtained.

To obtain the 39,700 μ. s. repetition period, the switch 59 is moved to the #3 position. Now the 40,000 μ. s. pulses are applied to the divider 33 through the capacitor 61c which has a capacity value such that a 40,000 μ. s. pulse causes the divider 33 to lose three counts, i. e., to trigger 300 μ. s. early. Thus, the desired 39,700 μ. s. period is obtained.

In a similar way the repetition periods of 39,600 μ. s., 39,500 μ. s., 39,400 μ. s. and 39,300 μ. s. are obtained by moving the switch arm 59 to the switch positions #4, #5, #6 and #7, respectively.

Note should be made of the fact that because the entire 100 μ. s. period or periods are subtracted at the start of the 40,000 μ. s. deflecting cycle (rather than 50 μ. s. at the start of the cycle and 50 μ. s. at the middle of the cycle), it is necessary to add to the time reading a time correction of K 50 μ. s. where K is the station or channel number in the example illustrated in which the first channel (having no subtraction) is identified as #0. This correction is one that could be made on the time lines of the map itself if new maps were drawn for this particular system.

*Cathode ray trace and timing marker presentation*

Before describing that portion of the receiving apparatus of Fig. 1 to which the pulses from the pulse generator unit 10 are applied, reference will be made to Figs. 2 to 7, inclusive, showing the appearance of the cathode ray patterns at successive steps in determining the time interval between the A and B pulses from a pair of ground stations. First, it will be noted that in Figs. 2-6 showing patterns for the A and B pulse alignment switch position (described later), there are four cathode ray sweep traces, *ab, cd, ef* and *gh*, the traces *cd* and *gh* being superimposed. The sweeps *ab* and *ef* are slow sweeps, and the sweeps *cd* and *gh* are fast sweeps. The sequence of deflection is *ab, cd, ef, gh* and back to the starting point *a* to repeat the sequence.

The graphs N and Q of Fig. 8 show the wave shapes of the horizontal and vertical deflecting waves for obtaining the above-described cathode ray sweep. The starting time *t* of the point on the horizontal deflecting wave N indicated at *t* may be adjusted by adjusting the multivibrator 56 as will be explained hereinafter. It should be noted that as shown in Fig. 8, the B pulse is the one that occurs after the mid-point of the A pulse period, and that this is the pulse that is made to fall on the adjustable deflecting wave trace.

Referring again to Figs. 2 to 7, the received pulses A and B may first appear on the slow trace *ef* as shown in Fig. 2 where they are made to stay stationary by an adjustment of the crystal oscillator frequency at the knob 12 in the event that there is a slight drift of these A and B pulses coming from the selected pair of ground stations. The A and B pulses are now brought into alignment or coincidence on the fast sweep trace *cd* and *gh*, as shown in Fig. 6, by the following procedure. By adjustment of the crystal oscillator frequency at the knob 12 and/or by moving the station selection switch 59 to obtain a different pulse repetition rate, the pulse B is drifted onto the fast trace *cd*, as shown in Fig. 3, and is then drifted further towards the other end of the fast trace, as shown in Fig. 4, where the scale is expanded due to the fact that the deflecting wave portion for the fast sweep follows substantially a logarithmic law as will be seen from an inspection of graph N in Fig. 8. Next the pulse A is brought onto the fast trace *gh* as shown in Fig. 5, and it is then brought into coincidence with the pulse B, this condition being illustrated in Fig. 6 and in Fig. 8. In order to bring the pulse A onto the fast trace *gh* and make it coincide with the pulse B, the starting time of the horizontal deflecting wave N at *t* (Fig. 8) is adjusted by adjusting the multivibrator 56 at the knob 56' (Figs. 1 and 10), the circuit for accomplishing this being described hereinafter.

A comparison of the timing of the A and B pulses with respect to the horizontal deflecting wave N (Fig. 8) will show that the condition of coincidence of the pulses A and B has been illustrated, both pulses falling on the left ends of successive fast traces and occurring at equal time intervals from the starts of the fast traces. It will be understood that while the pulses A and B and their corresponding fast traces appear alternately on the cathode ray tube screen, they appear to the eye to occur simultaneously because of persistence of vision, lag of phosphorescence of the screen, or both.

After the pulses A and B have been aligned as shown in Fig. 6, the operator moves a switch from an "alignment" position to a "time reading" position. The timing marker pulses now appear on the several sweep traces as shown in Fig. 7 and by counting certain of these timing markers, the desired time difference between the pulses A and B can be obtained. The number of full 1000 $\mu$. s. intervals in this time difference may be determined, for example, by counting the number of 1000 $\mu$. s. timing markers on the trace ab which lie between the left end of the trace ab and the left end of the trace ef (indicated at t) and dividing by 2. The additional number of microseconds in the desired time difference can be estimated roughly from the fractional 1000 $\mu$. s. spacing that remains between the last 1000 $\mu$. s. mark counted and the left end of the sweep ef, but in practice it is determined precisely by counting on a fast sweep trace gh the 100 $\mu$. s. timing markers appearing thereon, by counting 10 $\mu$. s. timing markers appearing thereon and by estimating the units. This last feature will be described after a more complete discussion of the circuit.

From the foregoing discussion, it will be apparent that the amount that the starting time t of the graph N (Fig. 8) has to be shifted from some predetermined position, such as a center position, in order to bring the pulse A into coincidence with the pulse B is a measure of the time difference between the pulses A and B; or in the example mentioned, it is a measure of the amount that the pulse A is away from the mid-point of the repetition period of the pulse B. It will be noted that time t is both the termination of the slow sweep ef and the start of the fast sweep gh minus 1000 $\mu$. s. As will be evident from the more detailed discussion which follows, this time difference between pulses A and B may be obtained as previously mentioned by measuring the difference in the durations of the two slow sweeps and then dividing by 2, the dividing by 2 being necessary in this instance since changing the starting time t lengthens one slow sweep and at the same time shortens the other slow sweep.

*General description of cathode-ray trace producing circuits*

The circuit for obtaining the operation described in connection with Figs. 2 to 7 will first be described generally with reference to the block diagram of Fig. 1, with reference to the graphs of Fig. 8, and with reference to Fig. 10 showing specific circuits for certain blocks of Fig. 1. The circuit details of Fig. 10 will be described later.

Referring to Figs. 1, 8 and 10, the multivibrator 56 is triggered by the 40,000 $\mu$. s. pulses to produce rectangular voltage waves G and G' of opposite polarity which are differentiated by differentiating networks 72 and 71, respectively, to produce waves H and I, respectively. The timing of the back edge of the wave G (and of the corresponding edge of wave G') is adjustable by means of the knob 56', this timing of the back edge controlling the starting time at t of the deflecting wave N as will soon be apparent. The multivibrator 56 may be of the well known type described in British Patent 456,840 to White and in the A. I. E. E. Vol. 60, 1941, pp. 371 to 376. The specific circuit for the multivibrator 56 shown in Fig. 10 employs cathode coupling.

The positive pulses of the H and I waves trigger a multivibrator 73 which is referred to as the "preset" multivibrator since it produces a wave J that is supplied over a conductor 76 to an inverter tube 77 for periodically bringing the deflecting voltage wave N to a predetermined or preset voltage level $e_1$ (Fig. 8).

The deflecting wave N appears across a capacitor C1 in the cathode circuit of a vacuum tube 74, the wave N being brought to the voltage level $e_1$ by charging capacitor C1 through the tube 74 as follows: The wave J is supplied over the conductor 76 to the polarity reversing tube 77 to obtain the wave M having the narrow pulse portions of positive polarity. The wave M is applied to the grid of the charging tube 74 whereby the narrow positive pulses of wave M drive the tube 74 to low plate-cathode impedance long enough for capacitor C1 to charge up to the voltage $e_1$. The positive pulses of wave M and the corresponding $e_1$ portions of the deflecting wave N are of 920 $\mu$. s. duration in the present example. It will be noted that the start of this 920 $\mu$. s. interval is the end of the slow sweep portion of wave N and that the end of said 920 $\mu$. s. interval is the beginning of the fast logarithmic sweep portion.

The fast sweep portion of wave N is produced as follows: The wave J is supplied over another conductor 78 to a differentiating circuit 79 to produce the wave K which is applied to a multivibrator 81. The positive pulses of wave K, which occur at the back edges of the narrow negative pulse portions of the wave J, trigger the multivibrator 81 to produce the wave L. Thus the narrow positive portions of wave L occur immediately following the positive portions of the wave M (which is wave J inverted) and are applied to the grid of a vacuum tube 82 for discharging the capacitor C1 through a network 83 at a logarithmic discharge rate thereby producing the fast sweep portion cd of the wave N. The next positive portion of wave L produces the fast sweep portion gh of wave N.

At the end of a fast sweep, during which the capacitor C1 is discharged to a voltage level $e_2$ (Fig. 8), capacitor C1 is charged at a comparatively slow rate through resistors 84 and 86 by the +B voltage source. Thus, at the end of each fast sweep wave portion there is produced a slow sweep wave portion. The successive slow sweep wave portions ab and ef are identical in slope, that is, the successive slow sweeps are alike except as to their lengths or duration. As previously noted, successive fast sweeps are identical.

The horizontal deflecting wave N thus produced across the capacitor C1 is applied to a horizontal deflection amplifier 87 by way of a conductor 88 and from the amplifier 87 to the horizontal deflecting plates 89 of the cathode ray tube 91.

From the foregoing description and from a reference to the sweep separation wave Q (Fig. 8) which is applied to the vertical deflecting plates 92, it will be apparent how the sweep traces ab, cd, and ef of Figs. 2 to 6 are obtained. It will be noted that following each slow sweep (at the left hand end of the traces as shown in Figs. 2–6), the cathode ray "rests" for the 920 $\mu$. s. interval that the deflecting wave N is at the voltage level $e_1$; then it is suddenly deflected vertically by the wave Q. The deflection sequence is as indicated in Figs. 2-7, i. e., a—b, c—d, e—f, g—h. It will be noted that in Fig. 7 the two fast sweeps cd and gh are separated.

Referring again to the block and circuit diagrams of Figs. 1 and 10, the vertical deflection or trace separation wave Q is produced by supplying the wave G from the M. V. 56 over a conductor 93 to a cathode-follower tube 94 and from the tube 94 over a lead 96 to a mixing and clipping tube 97 where the wave G and a wave O are added to produce the wave P (Fig. 8). The wave O is supplied from the M. V. 81 over a conductor 98 and is the same as wave L except it is of opposite polarity. The output of the tube 97 is the desired trace separation wave Q which is supplied over a conductor 99 to the lower vertical deflecting plate 92.

As stated in connection with Figs. 2–6 and Fig. 7, the operator throws a switch first to a pulse "alignment" position for aligning the pulses A and B from a pair of ground transmitters (the position for Figs. 2–6) and then throws it to a time "marker reading" position to count time marker pulses (the position for Fig. 7). This switch is shown at 101 in Figs. 1 and 10. In the "align" position of switch 101, a radio receiver 102 supplies the A and B pulses of a pair of ground stations over a conductor 103 to the upper vertical deflecting plates 92. The receiver 102 is tuned to the carrier wave frequency common to all the transmitter ground stations of the navigation system, station selection being by means of the different pulse repetition rates for different pairs of stations as previously described.

In the time marker "read" position of switch 101, the time marker pulses of 10 μ. s., 100 μ. s., 1000 μ. s. and 10,000 μ. s. repetition periods are supplied from a mixer tube 104 over a conductor 106, through a polarity reversing tube 105 and over a conductor 106' to the upper vertical deflecting plate 92, the A and B pulses no longer being applied to the cathode ray tube 91.

In addition to the timing markers that are supplied over the lead 106' to the upper deflecting plate 92, there is a sweep separation voltage wave G' (Fig. 8) that separates successive fast sweeps whereby, as shown in Fig. 7, the sweep trace gh is shifted to a position above the trace cd. It will be noted that the slow trace ab at the same time is shifted upward toward the other slow sweep trace ef but this does no harm as the traces ab and ef previously had sufficient separation to permit this incidental upward shift of trace ab. The trace separation wave G' is obtained by taking some of the signal G from the cathode follower 94 and supplying it over a lead 100 to the mixer tube 104. At the inverter tube 105, the wave G (and the marker pulses as well) is reversed in polarity to appear on the lead 106' as the wave G'.

Detailed description of Figure 10

Figure 1:
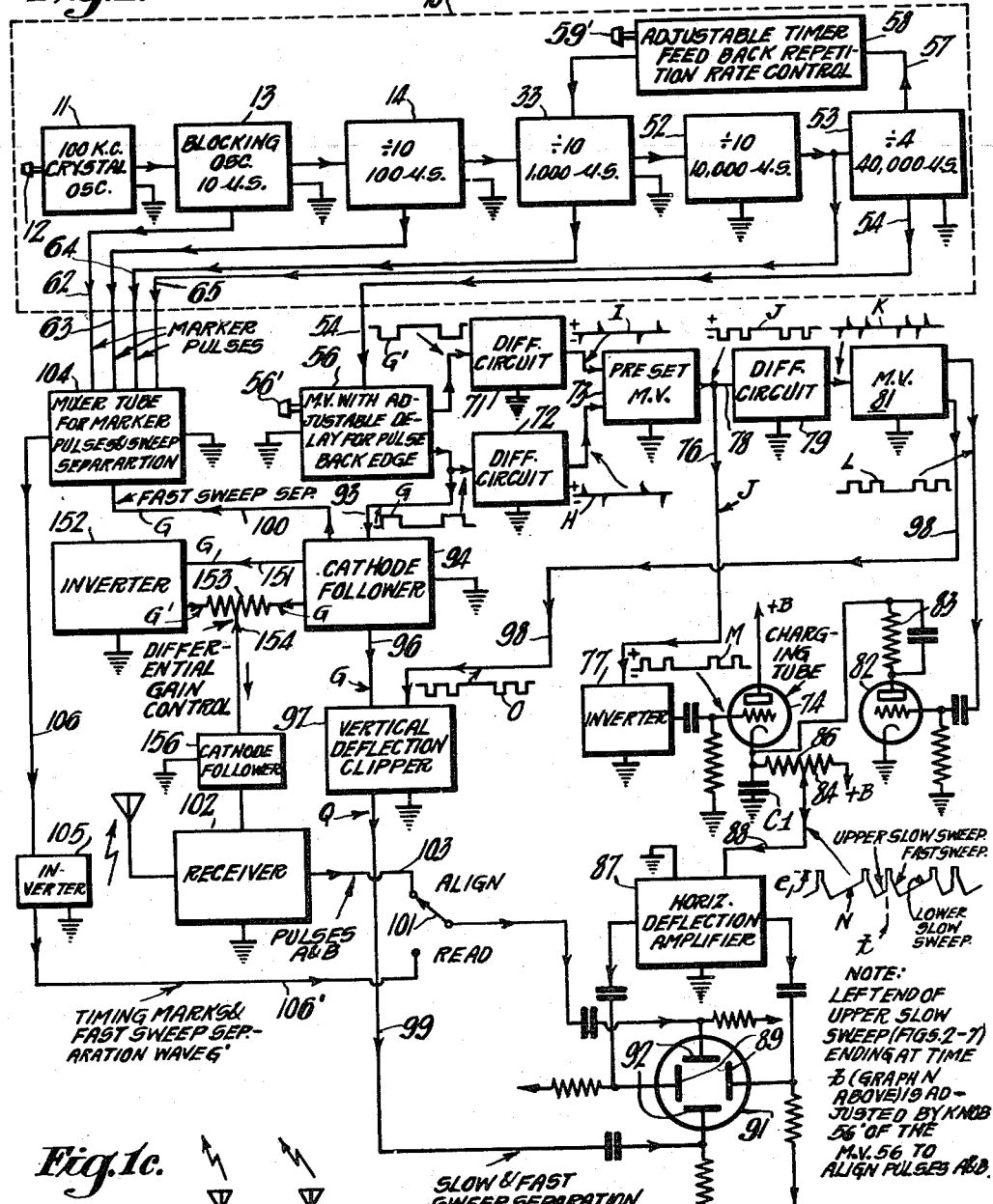
Figure 1C:
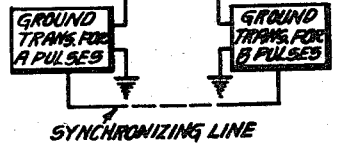

The detailed description of Fig. 10 will now be given. If desired, however, this detailed description may be read later as it is not essential to an understanding of the following portion of the specification which describes how the time difference between the pulses A and B is measured.

Referring to Fig. 10, the multivibrator 56 comprises a vacuum tube envelope 56a containing two triodes which are connected to form a cathode-coupled multivibrator. The 40,000 μ. s. pulses from the lead 54 are applied to the grid of the first triode, this grid having an adjustable positive bias applied thereto through a grid resistor 55. This bias is adjusted by means of the control knob 56 for adjusting the time of occurrence of the back edge of the multivibrator pulse.

The differentiating circuit 71 applies the pulses I to the grid 119 of one triode of the multivibrator 73. The circuit 71 comprises a small coupling capacitor 120 and a grid resistor 121 of the multivibrator 73. A small capacitor 122 may be connected across resistor 121 to reduce spurious signal pick-up in the absence of sufficient shielding.

The differentiating circuit 72 applies the pulses H to the grid 123 of another triode that has its plate and cathode connected to the plate and cathode, respectively, of the first triode. The circuit 72 comprises a small coupling capacitor 124 and a grid resistor 126. A small capacitor 127 may be connected across resistor 126 to reduce spurious signal pick-up.

The capacitors 128 and 128' in multivibrators 56 and 73, respectively, are for the purpose of reducing spurious signal pick-up.

The "preset" multivibrator 73 comprises, in addition to the two parallel connected triodes, a triode 73c having a grid 129 that is coupled through a capacitor 130 to the plates of said parallel connected triodes. A positive bias is applied to the grid 129 through a grid resistor 131. The three triodes have a common cathode resistor 132.

The operation of the multivibrator 73 is as follows: In the absence of an applied pulse from the differentiating circuits 71 and 72, the triode 73c is conducting. The grid of triode 73c is being held slightly positive whereby there is a direct-current charge on the capacitor 130 due to grid current flow. A positive pulse of wave I makes triode 73a conducting, the triode 73b remaining non-conducting, and the triode 73c immediately being made non-conducting by a negative pulse applied through the capacitor 130. Now with no anode current from tube 73c flowing through the cathode resistor 132, the tube 73a remains conducting after the applied pulse terminates. The negative pulse applied to the tube 73c also takes the above-mentioned D.-C. charge off the capacitor 130.

The triode 73a remains conducting at the termination of the applied positive pulse. After a predetermined interval fixed by the time constant of the grid circuit of triode 73c, the capacitor 130 again is charged sufficiently by grid current so that the triode 73c again becomes conducting and the triode 73a again is biased to cut-off. One pulse of the wave J is thus produced having a duration equal to the period that the triode 73a is conducting, this being the period that the tube 73c is non-conducting.

Similarly, when a moment later a positive pulse of the wave H is applied to the triode 73b, the triode 73b conducts and applies a negative pulse to the triode 73c to make it non-conducting. Again triode 73c remains non-conducting and the triode 73b remains conducting for said predetermined interval to produce the next pulse of the wave J.

The wave J which is supplied over the conductor 78 is differentiated by the circuit 79, and the resulting wave K triggers the M. V. 81 to produce the waves L and O. The differentiating circuit 79 comprises a small capacitor 133 and a grid resistor 134. A small capacitor 136 may be connected across resistor 134 to reduce spurious signal pick-up.

The multivibrator 81 is similar to the multivibrator 56, and, if desired, there may be the same provision for adjustment of the width of the pulses L and O which ordinarily remains fixed.

The circuit comprising the vacuum tubes 77, 74 and 82, to which the waves J and L are applied for producing the horizontal deflecting wave N, has already been fully described. Certain circuit values have been indicated in ohms, microfarads and micro-microfarads merely by way of example.

The sweep separation wave Q that is supplied to the lower vertical deflecting plate 92 of cathode ray tube 91 is obtained from the clipper tube 97 that clips the wave P which is the sum of the waves G and Q. The wave G is obtained from the multivibrator 56 through the cathode follower tube 94, the wave O is obtained from one side of the multivibrator 81, and the two waves are added in the grid circuit of the clipper tube 97. It will be noted that the sweep separation wave Q is always applied to the lower vertical deflecting plate 92 whether the switch 101 is in the "align" position or in the "read" position.

The upper deflecting plate 92 has only the received A and B pulses applied to it when the switch 101 is in the "align" position.

In the "read" position the upper deflecting plate 92 has the time marker pulses and the separation wave G' applied to it from the mixer and inverter tubes 104 and 105. In the example illustrated, the marker pulses are taken off 10 ohm resistors (Fig. 1a) in the cathode circuits of the blocking oscillators 13, 22 and 41, and are mixed by supplying them through high impedance resistors 141, 142, 143 and 144 to the grid of the mixer tube 104.

The sweep separation wave G is taken off the cathode resistor of the tube 94 through a coupling circuit comprising a capacitor 146, a shunt resistor 147 and a series resistor 148.

*Differential gain control circuit*

A differential gain control circuit for the receiver 102 preferably is provided as indicated in Fig. 1 and as shown in more detail in Fig. 1b for the purpose of keeping the amplitudes of the A and B pulses substantially alike at the receiver output, thus facilitating the A and B pulse alignment.

Referring first to Fig. 1, the wave G is supplied from the cathode follower 94 over a lead 151 to a polarity reversing tube 152. The inverted wave G' from the tube 152 and the wave G from the cathode follower 94 are applied to opposite ends of a potentiometer resistor 153. A variable gain control tap 154 takes signal off resistor 153 and supplies it to a cathode follower tube 156. The cathode resistor 157 of tube 156 (Fig. 1b) is included in the cathode circuit of an intermediate frequency amplifier tube 158 of the receiver 102 whereby the gain of the I.-F. tube 158 is decreased by current flow through cathode resistor 157.

In operation, the gain of the I.-F. tube 158 is changed only if a positive voltage is applied to the grid of the tube 156, the tube 156 being biased to cut-off by the anode current of the I.-F. tube flowing through the cathode resistor 157. When the tap 154 is at some position near the middle of resistor 153, it is at zero voltage and the gain remains unchanged. If the tap 154 is at either side of this position, either the positive half cycle of wave G or of the inverted wave G' will make the grid of tube 156 more positive for the duration of this half cycle and thus reduce the gain of the I.-F. amplifier tube 158. The amount of gain reduction and the particular half cycle during which the gain is reduced depend upon the position of the tap 154.

*Description of time difference measurement*

The specific manner in which the time interval between A and B pulses is obtained will now be described with particular reference to Figs. 7, 8, 9 and 11. Note is made of the fact that the graphs in Fig. 8 are drawn for a different time difference reading in whole number 1000 $\mu$. s. intervals than that assumed for Figs. 7, 9 and 11. The fractional 1000 $\mu$. s. interval, however, is the same in all figures.

First it should be noted in Fig. 8 that the start of each cycle of the rectangular wave G (i. e., the front edge of the positive portion) is fixed with reference to the timing marker pulses since it is a 40,000 $\mu$. s. pulse derived from the frequency divider chain that triggers the multivibrator 56 generating the wave G. Next it should be noted that by changing the time of occurrence of the back edge of said positive portion of wave G (as by adjusting knob 56' of multivibrator 56), the narrow pulse portions of the wave J may be advanced or retarded, that the narrow pulse portions of waves L and M follow such timing changes of the wave J, and that the timing of the cathode ray sweep wave N at the point $t$ is changed correspondingly.

Specifically, changing the timing of the back edge of wave G changes the start of the fast sweep $gh$ and also changes the time $t$ that the slow sweep $ef$ ends, thus changing the length of sweep trace $ef$ and the position of its left end at time $t$ (Fig. 7). It is noted that the fast sweep $gh$ always starts 920 $\mu$. s. after the termination of slow sweep $ef$ in the example assumed, and that the sweep $gh$ always lasts for the duration of the narrow pulse in wave L. Also the fast sweep $gh$ (as well as the fast sweep $cd$) always starts with a voltage $e_1$ and ends with a voltage $e_2$.

Since the slow sweep $ab$ starts as soon as the fast sweep $gh$ ends, changing the back edge timing of wave G also changes the time that the slow sweep $ab$ starts. However, the sweep $ab$ always ends upon the occurrence of a 40,000 $\mu$. s. pulse; and the deflecting wave N then repeats.

It will now be evident that when the multivibrator 56 is adjusted to align the pulses A and B, the left end of the trace $ab$ (referring to Fig. 7) is moved either to the right or to the left, while the left end of the trace $ef$ (terminating at time $t$) is moved in the opposite direction; i. e., one trace being lengthened as the other is shortened. The starting positions of both slow sweep traces remain fixed at the right hand edge of the screen pattern because of starting at the fixed voltage level $e_2$.

It is evident that the end $b$ of the slow sweep $ab$ always coincides with a 1000 $\mu$. s. pulse. Thus, referring to Fig. 7, the difference in the time duration of the two slow sweeps $ab$ and $ef$ can be found by counting those timing markers on the sweep $ab$ appearing between the left end of the sweep $ab$ and the left end of the sweep $ef$ (terminating at time $t$) to find the difference in terms of 1000 $\mu$. s. intervals. The fraction of the last 1000 $\mu$. s. interval (i. e., the space between the last 1000 $\mu$. s. marker and the end of the sweep $ef$ at $t$) may be estimated, but following preferred practice, it is found accurately by means of the 100 $\mu$. s. and 10 $\mu$. s. markers on the traces $gh$ and $cd$ as explained hereinafter under the heading Measurement of fractional 1000 $\mu$. s. time interval. The count of 1000 $\mu$. s. spaces between the slow traces $ab$ and $ef$ must be divided by 2, as previously mentioned, to find the desired time difference between pulses A and B since both slow traces were changed in length when the A and B pulses were aligned.

To understand more clearly why the time difference between the received A and B pulses can be found by observing the time interval between the ends of the two slow traces $ab$ and $ef$ after having aligned the said A and B pulses, it should be noted that alignment of the A and B pulses (shown by the two lower graphs of Fig. 8) is accomplished by changing the timing of the start of the fast sweep $gh$ until the time relation of the sweep $gh$ to the pulse A is the same as the time relation of the sweep $cd$ to the pulse B. This is apparent in Fig. 8 where the condition of pulse alignment is illustrated. It should also be noted that it is the A pulse that falls on the adjustable sweep, i. e., on the sweep $gh$, this being important as will be apparent from the following description.

The time difference actually measured is the amount that the deflecting wave N at the point $t$ (the point $t$ being the start of the fast sweep $gh$ minus the 920 $\mu$. s. interval) has to be advanced in time to change from a condition where the slow sweep traces are of equal length to a condition where the pulses A and B are aligned. Stated differently, the A pulse and B pulse time difference that is measured is the amount that the A pulse precedes the mid-point of the time interval between successive B pulses.

For instance, if the A pulse were in the position shown in dotted line in Fig. 8, the time difference reading would be zero. However, with the A pulse in the position shown in solid line in Fig. 8, the time difference is 8000 $\mu$. s.$\div$2 or 4000 $\mu$. s. plus about 800 $\mu$. s.$\div$2 or 400 $\mu$. s. as closely as it can be estimated from the fractional 1000 $\mu$. s. interval indicated at $x$. It will be understood that accuracy of the time measurement obtained by counting marker pulses lying between the ends of the two slow sweep traces depends upon having the slow sweeps identical from their start to at least the termination of the sweep $ef$.

*Measurement of fractional 1000 $\mu$. s. time interval*

Referring now particularly to Figs. 7, 9 and 11, in order to determine accurately the value of the fractional 1000 $\mu$. s. interval $x\div2$, the operator counts timing markers from right to left on the fast sweep trace $gh$. The marks counted are those lying between a cross-hair marker on the sweep trace $cd$ and the first 1000 $\mu$. s. pulse (indicated at $M_x$) appearing to the right of the cross-hair marker. The cross-hair marker has a fixed position and is the first marker on the trace $cd$ from the left end of the trace that extends up to the trace $gh$. This cross-hair marker is one of the 100 $\mu$. s. markers although a 1000 $\mu$. s. marker is superimposed on it when the receiver is on the #0 station position. In Fig. 9, because of lack of space on the drawing, the amount of scale expansion by the fast sweep waves $cd$ and $gh$ is less than it should be. The expansion is shown more accurately in Fig. 11. The value of the fractional 1000 $\mu$. s. interval is found by counting the number of 100 $\mu$. s. intervals, the number of 10 $\mu$. s. intervals and estimating the number of 1 $\mu$. s. intervals, the count being from $M_x$ to the cross-hair.

Since the fractional 1000 $\mu$. s. interval $x\div2$ does not itself fall on a fast sweep, as is evident from Figs. 8 and 9, it is apparent that a different but corresponding or proportional interval actually is measured by the above-described counting on the fast sweeps. This interval of corresponding or proportional duration is one that falls on the fast sweep $gh$ and is indicated at $z$ in Fig. 8 (at graph D) and in Fig. 9. The duration of the interval $z$ equals that of the interval $z\div2$ as will become apparent from the following discussion. The interval $z$ is the same as the interval indicated at $y$ but it occurs 1000 $\mu$. s. later than $y$, the interval $y$ being the time from the left end of the sweep $ef$ (at time $t$) to the next occurring 1000 $\mu$. s. pulse. It will be seen that the interval $y$ is the amount that the edge $t$ of wave N has been shifted to the left past coincidence with a 1000 $\mu$. s. mark and therefore is the fractional $x\div2$ interval to be determined.

The 100 $\mu$. s. cross-hair marker pulse is indicated at the graph C (Fig. 8), the scale of graph C being expanded ten times as compared with the graphs below it. In Fig. 9, the cross-hair pulse is shown coinciding with the 1000 $\mu$. s. pulse that occurs 1000 $\mu$. s. after the termination of the sweep $ab$. This coincidence of the cross-hair mark and 1000 $\mu$. s. mark exists only when the station selector switch is set on the #0 station position.

Referring more specifically to Fig. 9, this figure shows the cathode ray traces with the timing marks thereon as constructed from the deflecting wave N and from the timing marker pulses. From Fig. 9, it can be seen that an operator may determine the amount the adjustable edge $t$ of wave N has been advanced in time with respect to the 20th 1000 $\mu$. s. marking pulse (indicated as 20,000 $\mu$. s.) by counting timing markers as described above. The marking pulse at 20,000 $\mu$. s. is at the mid-point of the 40,000 $\mu$. s. period of the deflecting wave N and would also be at the mid-point of the period of the B pulses if the A and B pulses occurred in the dotted line positions $A_1$ and $B_1$ of Fig. 9. The fact that both A and B pulses are shifted to the right to their solid line positions does not affect the time measurement.

The timing marker counting on the slow sweep trace is from the 40th 1000 $\mu$. s. pulse (marked 40,000 $\mu$. s.), but this pulse usually is just off the sweep $ab$ and doesn't show on the trace $ab$; therefore, the first marker from the left end on trace $ab$ is counted as 1000 $\mu$. s. In the case illustrated in Fig. 9, there are 12 of the 1000 $\mu$. s. markers on the trace $ab$ counting from the left end of trace $ab$ to the left end of the trace $ef$. Thus the desired time difference is 12,000 $\mu$. s.$\div$2=6000 $\mu$. s. plus the fractional interval $x\div2$.

Instead of attempting to find the duration of the fractional interval $x\div2$ itself, the unknown fractional interval is found as discussed above by observing the amount that the adjustable edge $t$ of the wave N is shifted to the left of the nearest 1000 $\mu$. s. marker, this amount being indicated at $y$. This, of course, is a direct measure of the amount the adjustable edge $t$ of wave N has been shifted to the left past coincidence with a 1000 $\mu$. s. mark, and is the fractional 1000 $\mu$. s. interval to be determined, there being no fractional interval if the edge $t$ happens to coincide with a 1000 $\mu$. s. marker pulse.

As a practical matter, the interval $y$ cannot very well be made to fall on a fast sweep since the interval $y$ starts instantaneously with the termination of the sweep $ef$. Therefore, the interval $z$ occurring 1000 $\mu$. s. later than the time $t$ and equal to the interval $y$ is measured. This is accomplished as follows:

The 1000 $\mu$. s. marking pulse which occurs 1000 $\mu$. s. later than the 1000 $\mu$. s. mark defining the interval $y$ is located where it falls on the fast sweep $gh$; thus it appears on the sweep trace $gh$ as indicated at $M_x$. Also, a cross-hair marker is produced on the trace $cd$, as indicated, by the tenth 100 $\mu$. s. pulse following the start of wave N, i. e., following the termination of the sweep $ab$, this pulse coinciding with the first 1000 $\mu$. s. marker pulse when the station selection is on #0 position. This cross-hair pulse occurs 1000 $\mu$. s. later than said start of wave N and, since the two fast sweeps $cd$ and $gh$ are identical, the cross-hair mark indicates that point on the sweep $gh$ which is 1000 $\mu$. s. from the adjustable edge $t$ of wave N. Likewise, this indicated point is 1000 $\mu$. s. from the beginning of the interval $y$ and is the start of the interval $z$. Thus, the desired fractional 1000 $\mu$. s. interval is found by counting from the mark $M_z$ occurring at the end of interval $z$ to the cross-hair mark occurring at the start of interval $z$.

In the example shown, the count from marker $M_z$ to the cross-hair is three 100 $\mu$. s. markers or 300 $\mu$. s. plus three 10 $\mu$. s. markers or 30 $\mu$. s. plus an estimated one-third of a 10 $\mu$. s. interval or 3 $\mu$. s., or a total count from marker $M_z$ to the cross-hair marker of 333 $\mu$. s. Since the previous reading of 1000 $\mu$. s. intervals gave 6000 $\mu$. s., the total reading is 6,333 $\mu$. s.

Fig. 11 shows more accurately the preferred shape of the fast sweep deflecting waves and the resulting expansion of the 100 $\mu$. s. and 10 $\mu$. s. timing marks on the fast sweep traces. The scale expansion should be such that the 100 $\mu$. s. markers and the 10 $\mu$. s. markers are equally easy to read. It will be apparent that on the trace $gh$ between the marker $M_z$ and the cross-hair marker, the 100 $\mu$. s. markers and the 10 $\mu$. s. markers can readily be counted, and the number of 1 $\mu$. s. intervals can readily be estimated.

From the foregoing description it will be apparent that by making the A pulse fall on the trace having the adjustable starting time, I have been able to provide an expanded trace with the expansion occurring in the proper region to expand the fractional 1000 $\mu$. s. interval, and with the expansion the greatest where it is needed the most, i. e., where the 10 $\mu$. s. markers are to be counted. It will also be seen that this makes possible a simple scale and cross-hair arrangement by means of which the 100 $\mu$. s. and 10 $\mu$. s. marks may be counted with little or no possibility of an operator becoming confused as to the marks to be counted.

It may be noted that the 1000 $\mu$. s. intervals may be counted in other ways than the one described. For example, the feature of dividing by two is avoided if on the trace $ef$ the marks from the 10,000 $\mu$. s. mark to the left end of trace $ef$ are counted and subtracted from 10. Thus, in the example of Figs. 9 and 11, the count is 3; then $10-3=7$ or 7000 $\mu$. s. less some fraction or 6000 $\mu$. s. plus the fraction determined on the fast sweeps.

It should be understood that the invention is not limited to the specific circuit and circuit elements described or to the specific trace presentation described, one of the main features of the invention being that of having the A pulse fall on the sweep that has the adjustable starting time whereby a cathode-ray trace may be expanded at the proper region for obtaining an accurate time difference reading. In the specific example illustrated, where the slow and fast sweeps occur alternately, there is the additional advantage that both the whole number 1000 $\mu$. s. intervals and the fractional 1000 $\mu$.s. interval may be determined by switching to only one reading position after the A and B pulses have been aligned.

I claim as my invention:

1. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, successively producing pairs of sequentially occurring deflecting waves which are identical throughout their useful deflecting portions, deflecting a cathode ray successively by said waves to produce two cathode ray traces, causing said A and B pulses to appear on said two traces with the A pulse on the trace that is produced by the second of said pair of deflecting waves, adjusting the starting time of the second of said pair of deflecting waves until it is such that said A and B pulses are aligned, and producing timing marks on the trace produced by said second deflecting wave whereby the time difference between a time reference point and the starting time of said second deflecting wave may be determined.

2. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, successively producing pairs of sequentially occurring deflecting waves having decreasing slope from at least near the start of the wave and which are identical throughout their useful deflecting portions, deflecting a cathode ray successively by said waves to produce two parallel adjacent cathode ray traces which are expanded at one end, causing said A and B pulses to appear on said two traces with the A pulse on the trace that is produced by the second of said pair of deflecting waves, adjusting the starting time of the second of said pair of deflecting waves until it is such that said A and B pulses are aligned, and producing timing marks on the trace produced by said second deflecting wave whereby the time difference between a time reference point and the starting time of said second deflecting wave may be determined.

3. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring deflecting waves which are identical throughout their useful deflecting portions, means for deflecting a cathode ray by said waves to produce two cathode ray traces, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for producing timing marks that appear on the trace produced by said second deflecting wave.

4. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring deflecting waves having decreasing slope from at least near the start of the wave and which are identical throughout their useful deflecting portions, means for deflecting a cathode ray by said waves to produce two parallel adjacent cathode ray traces which are expanded at one end, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for producing timing marks that appear on the trace produced by said second deflecting wave.

5. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring deflecting waves, means for deflecting a cathode ray by said waves to produce two cathode ray traces, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, means for producing groups of timing pulses, and means for making said timing pulses appear as timing marks on said traces with one of the shorter-repetition-period marks appearing on the expanded end of the trace produced by said first deflecting wave and extending substantially to the other trace whereby it may be utilized as a fixed position cross-hair in counting timing marks appearing on the adjustable trace.

6. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring identical deflecting waves having decreasing slope from at least near the start of the wave, means for deflecting a cathode ray by said waves to produce two parallel adjacent cathode ray traces which are expanded at one end, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for producing groups of timing pulses, and means for making said timing pulses produce timing marks on said traces with one of the shorter-repetition-period marks appearing on the expanded end of the trace produced by said first deflecting wave and extending substantially to the other trace whereby it may be utilized as a fixed position cross-hair in counting timing marks appearing on the adjustable trace.

7. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring identical deflecting waves having decreasing slope from at least near the start of the wave, means for deflecting a cathode ray by said waves to produce two parallel adjacent cathode ray traces which are expanded at one end, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for producing groups of timing pulses that have a decimal relation to each other, and means for making said timing pulses appear as timing marks appear on said traces with one of the shorter-repetition-period marks appearing on the expanded end of the trace produced by said first deflecting wave and extending substantially to the other trace whereby it may be utilized as a fixed position cross-hair in counting timing marks appearing on the adjustable trace.

8. The method of measuring the time relation of a group of periodically recurring received A pulses with respect to a group of periodically received B pulses where both groups of pulses have the same repetition period and where the B pulse occurs following the mid-point of the period of the A pulses, said method comprising the steps of producing two successive cathode-ray deflecting waves starting at the same voltage level and each of identical slope and having a total repetition period equal to that of said A and B pulse repetition period, the slope of each wave being of decreasing steepness from at least near the start of the wave to the end of the wave, producing groups of timing pulses each having a different repetition period, each group having a fixed time relation to the start and finish of the cycle of said two deflecting waves, causing said deflecting waves to produce cathode-ray traces, the first portion of each being expanded, and causing said received B and A pulses to appear on the cathode-ray traces produced by the first and the second of said deflecting waves, respectively, on their expanded portions, advancing the start of the second deflecting wave of said deflecting wave cycle with respect to the mid-point of said cycle until the received pulses on said traces are in alignment or coincidence, causing said groups of timing pulses to produce timing marks on at least the trace produced by the second deflecting wave and determining the amount that the start of said second wave is shifted in time with respect to said mid-point of the deflecting wave cycle by counting timing marks on the second deflecting wave trace from a mark thereon indicating said deflecting cycle mid-point to a predetermined mark at the expanded end thereof.

9. The method of measuring the time relation of a group of periodically recurring received A pulses with respect to a group of periodically received B pulses where both groups of pulses have the same repetition period and where the B pulse occurs following the mid-point of the period of the A pulses, said method comprising the steps of producing two successive cathode-ray deflecting waves starting at the same voltage level and each of identical slope and having a total repetition period equal to that of said A and B pulse repetition period, the slope of each wave being of decreasing steepness from at least near the start of the wave to the end of the wave, producing groups of timing pulses having repetition periods that have a decimal relation to each other, each group having a fixed time relation to the start and finish of the cycle of said two deflecting waves, causing said deflecting waves to produce cathode-ray traces, the first portion of each being expanded, and causing said received B and A pulses to appear on the cathode-ray traces produced by the first and the second of said deflecting waves, respectively, on their expanded portions, advancing the start of the second deflecting wave of said deflecting cycle with respect to the mid-point of said cycle until the received pulses on said traces are in alignment or coincidence, causing said groups of timing pulses to produce timing marks on at least the trace produced by said second deflecting wave and determining the amount that the start of said second wave is shifted in time with respect to said mid-point of said deflecting wave cycle by counting timing marks on said second deflecting wave trace from a predetermined mark on the less expanded portion thereof to a predetermined mark at the expanded end thereof.

10. The method of measuring the time relation of a group of periodically recurring received A pulses with respect to a group of periodically received B pulses where both groups of pulses have the same repetition period and where the B pulse occurs following the mid-point of the period of the A pulses, said method comprising the steps of producing two successive cathode-ray deflecting waves starting at the same voltage level and each of identical slope and having a total repetition period equal to that of said A and B pulse repetition period, the slope of each wave being of decreasing steepness from at least near the start of the wave to the end of the wave, producing groups of timing pulses each having a different repetition period, each group having a fixed time relation to the start and finish of the cycle of said two deflecting waves, causing said deflecting waves to produce cathode-ray traces that are adjacent to each other, the first portion of each being expanded, and causing said received B and A pulses to appear on the cathode-ray traces produced by the first and the second of said deflecting waves, respectively, on their expanded portions, advancing the start of the second deflecting wave of said deflecting cycle with respect to the mid-point of said cycle until the received pulses on said traces are in alignment or coincidence, causing said groups of timing pulses to produce timing marks on said traces and determining the fractional interval of the number of longer timing pulse periods or intervals that the start of said second wave is shifted in time with respect to said mid-point of said deflecting wave cycle by counting shorter period markers from one of said longer period timing markers on the expanded portion of the trace produced by second deflecting wave to the next preceding longer period timing marker on the other trace to determine said fractional longer period interval to the nearest shorter period interval.

11. The method of measuring the time relation of a group of periodically recurring received A pulses with respect to a group of periodically received B pulses where both groups of pulses have the same repetition period and where the B pulse occurs following the mid-point of the period of the A pulses, said method comprising the steps of producing two successive cathode-ray deflecting waves starting at the same voltage level and each of identical slope and having a total repetition period equal to that of said A and B pulse repetition period, the slope of each wave being of decreasing steepness from at least near the start of the wave to the end of the wave, producing groups of timing pulses having repetition periods of 1000 $\mu$. s., 100 $\mu$. s. and 10 $\mu$. s., respectively, each group having a fixed time relation to the start and finish of the cycle of said two deflecting waves, causing the first and the second of said deflecting waves to produce a first cathode-ray trace and a second cathode-ray trace, respectively, that are adjacent to each other, the first portion of each trace being expanded, and causing said B pulses and said A pulses to appear on said first and second cathode-ray traces, respectively, on their expanded portions, advancing the start of said second deflecting wave of the deflecting wave cycle with respect to the mid-point of said cycle until the received pulses on said traces are in alignment or coincidence, causing said groups of timing pulses to produce timing marks on said traces and determining the amount that the start of said second wave is shifted in time with respect to said mid-point of said deflecting wave cycle by counting 100 $\mu$. s. marks from a 1000 $\mu$. s. timing mark on the expanded portion of the trace produced by second deflecting wave to the next preceding 1000 $\mu$. s. timing mark on the other trace to determine a fractional 1000 $\mu$. s. interval to the nearest 100 $\mu$. s. interval and counting the 10 $\mu$. s. marks from the last counted 100 $\mu$. s. timing mark to said next preceding 1000 $\mu$. s. timing mark on said other trace to determine said fractional 1000 $\mu$. s. interval to the nearest 10 $\mu$. s. interval.

12. The method of measuring the time relation of one group of periodically recurring received pulses with respect to another group of periodically recurring received pulses where both groups of pulses have the same repetition period, said method comprising the steps of producing two successive cathode-ray deflecting waves of identical slope and having a total repetition period equal to that of said groups of received pulses, producing groups of timing pulses having a fixed time relation to the start and finish of the cycle of said two deflecting waves, said groups of timing pulses having repetition periods that have a decimal relation to each other, causing each of said deflecting waves to produce a cathode-ray trace and causing a pulse of each group of received pulses to appear on said two cathode-ray traces, respectively changing the start of the deflecting wave that begins at an intermediate point in the full deflecting wave cycle until said received pulses on said traces are in alignment or coincidence, causing said timing marks to appear on said traces, and determining from the timing marks on said traces the amount of time that the start of said intermediate deflecting wave is shifted with reference to a selected point in said full deflecting wave cycle.

13. The method of measuring the time relation of one group of periodically recurring received pulses with respect to another group of periodically recurring received pulses where both groups of received pulses have the same repetition period, said method comprising the steps of producing two successive slow-sweep cathode-ray deflecting waves, said pair of deflecting waves having a total repetition period equal to that of said groups of received pulses, producing groups of timing pulses each group having a different repetition period and having a fixed time relation to the start and finish of the cycle of said two deflecting waves, causing each of said deflecting waves to produce a slow cathode-ray trace upon which a group of said timing pulses may be made to appear, also producing two successive fast-sweep cathode-ray deflecting waves each starting from the same voltage level and each of identical slope and having a total repetition period equal to that of said groups of received pulses, causing each of said fast-sweep deflecting waves to produce a cathode-ray trace and causing a pulse of each group of received pulses to appear on said two fast-sweep cathode-ray traces, respectively, changing the start of the second fast-sweep deflecting wave of said cycle with respect to the mid-point of the full deflecting wave cycle until said received pulses on said traces are in exact alignment or coincidence, causing the timing marks having one of the longer repetition periods to appear on at least the second of said slow-sweep traces to indicate within a certain fractional time interval of said longest repetition period the amount of time that the start of said second fast deflecting wave is shifted with respect to said mid-point of the full deflecting wave cycle, causing a pulse from said longer repetition period group and at least one group of pulses having a shorter repetition period that said longer repetition period to appear as timing marks on the fast-sweep trace produced by said second fast-sweep deflecting wave, causing a timing pulse from one of said groups having one of the shorter repetition periods to appear as a cross-hair marker on the trace produced by the first fast-sweep deflecting wave, and counting from a certain timing marker on the trace produced by said second fast-sweep wave to said cross-hair marker to determine said fractional time interval, said certain timing marker being the one produced by one of said longer-repetition-period pulse which follows said cross-hair marker immediately in time sequence along the traces.

14. The method of measuring the time relation of one group of periodically recurring received pulses with respect to another group of periodically recurring received pulses where both groups of pulses have the same repetition period, said method comprising the steps of producing two successive cathode-ray deflecting waves starting at the same voltage level and each of identical slope and having a total repetition period equal to that of said groups of pulses, producing groups of timing pulses each group having a different repetition period and having a fixed time relation to the start and finish of the cycle of said two deflecting waves, causing each of said deflecting waves to produce a cathode-ray trace and causing a pulse of each group of received pulses to appear on said two cathode-ray traces, respectively, changing the start of the second deflecting wave of said cycle until said received pulses on said traces are in alignment or coincidence, causing at least two groups of said timing pulses to appear as timing markers on the trace produced by said second deflecting wave, causing a timing pulse from the one of said two groups having the shorter repetition period to appear as a cross-hair marker on the trace produced by the first deflecting wave, and counting from a certain timing marker on the trace produced by said second wave to said cross-hair marker to determine the fractional time interval that the start of said second deflecting wave is shifted with respect to the mid-point of said full deflecting wave cycle, said certain timing marker being the one produced by a longer-repetition-period pulse and following said cross-hair marker in time sequence along the traces.

15. The method of measuring the time relation of one group of periodically recurring received pulses with respect to another group of periodically recurring received pulses where both groups of pulses have the same repetition period, said method comprising the steps of producing two successive cathode-ray deflecting waves starting at the same voltage level and each of identical slope, said pair of deflecting waves having a total repetition period equal to that of said groups of pulses, producing groups of timing pulses having a fixed time relation to the start and finish of the cycle of said two deflecting waves, said groups of timing pulses having different repetition rates, causing each of said deflecting waves to produce a cathode-ray trace and causing a pulse of each group of received pulses to appear on said two cathode-ray traces, respectively, changing the start of the second deflecting wave of said pair until said received pulses on said traces are in alignment or coincidence, causing at least two groups of said timing pulses to appear as timing markers on the trace produced by said second deflecting wave, causing a timing pulse from the one of said two groups having the longer repetition period to appear as a cross-hair marker on the trace produced by the first deflecting wave, and counting from a certain timing marker on the trace produced by said second wave to said cross-hair marker to determine the fractional time interval that the start of said second deflecting wave is shifted with respect to the mid-point of said full deflecting wave cycle, said certain timing marker being the one produced by a longer-repetition-period pulse and being the first appearing in time sequence along its trace following said cross-hair marker, said deflecting waves being shaped to expand the scale of said cathode-ray traces in the region lying between said cross-hair marker and said certain timing marker.

16. The method of measuring the time relation of one group of periodically recurring received pulses with respect to another group of periodically recurring received pulses where both groups of pulses have the same repetition period, said method comprising the steps of producing two successive cathode-ray deflecting waves starting at the same voltage level and of identical slope but of adjustable duration and having a total repetition period equal to that of said groups of received pulses, producing groups of timing pulses, each group having a different repetition period and having a fixed time relation to the start and finish of the cycle of said two deflecting waves, causing each of said deflecting waves to produce a cathode-ray trace and causing a pulse of each group of received pulses to appear on said two cathode-ray traces, respectively, changing the start of the deflecting wave that begins at an intermediate point in the full deflecting wave cycle until said received pulses on said traces are in alignment or coincidence, causing said timing marks to appear on said traces, and counting the timing marks on one of said traces from a reference point thereon to determine the amount of time that the start of said intermediate deflecting wave is shifted with reference to the mid-point of said full deflecting wave cycle.

17. The method of measuring the time relation of one group of periodically recurring received pulses with respect to another group of periodically recurring received pulses where both groups of pulses have the same repetition period, said method comprising the steps of producing two successive slow-sweep cathode-ray deflecting waves starting at the same voltage level and each of identical slope and having a total repetition period equal to that of said groups of pulses, producing groups of timing pulses each group having a different repetition period and having a fixed time relation to the start and finish of the cycle of said two deflecting waves, causing each of said deflecting waves to produce a cathode-ray trace and causing a pulse of each group of received pulses to appear on said two cathode-ray traces, respectively, changing the start of the second deflecting wave of said cycle with respect to the mid-point of said cycle until the received pulses on said traces are approximately in alignment or coincidence, also producing two successive fast-sweep cathode-ray deflecting waves each starting from the same voltage level and each of identical slope and the two fast-sweep waves having a total repetition period equal to that of said received pulses, causing each of said fast-sweep deflecting waves to produce a cathode-ray trace and causing a pulse of each group of received pulses to appear on said two fast-sweep cathode-ray traces, respectively, changing the start of the second fast-sweep deflecting wave of said deflecting wave cycle until said received pulses on said traces are in substantially exact alignment or coincidence, causing at least one of the longer-repetition-period groups of timing pulses to produce timing marks on at least one of said slow-sweep traces whereby from the resulting timing marks an operator may determine within a certain fraction of said longer repetition period the amount that the start of said second slow-sweep wave is shifted in time with respect to said mid-point of the full deflecting wave cycle, causing at least two of said groups of timing pulses to produce timing marks on the fast-sweep trace produced by said second fast-sweep deflecting wave, causing a timing pulse from the one of said two groups having the longer repetition period to appear as a cross-hair marker on the trace produced by the first fast-sweep deflecting wave, and counting from a certain timing marker on the trace produced by said second fast-sweep wave to said cross-hair marker to determine said fractional repetition period, said certain timing marker being the first one that occurs in time sequence along the second fast-sweep trace following said cross-hair marker and which is produced by one of said longer-repetition-period pulses, said fast sweep waves being shaped to expand the fast-sweep traces in the region of said fractional repetition period as compared with the remaining portions of the fast-sweep traces.

18. The method of measuring the time relation of one group of periodically recurring received pulses with respect to another group of periodically recurring received pulses where both groups of pulses have the same repetition period, said method comprising the steps of producing two successive slow-sweep cathode-ray deflecting waves starting at the same voltage level and each of identical slope and having a total repetition period equal to that of said groups of pulses, producing groups of timing pulses each group having a different repetition period and having a fixed time relation to the start and finish of the cycle of said two deflecting waves, causing each of said deflecting waves to produce a cathode-ray trace and causing a pulse of each group of received pulses to appear on said two cathode-ray traces, respectively, also producing two successive fast-sweep cathode-ray deflecting waves each starting from the same voltage level and each of identical slope and the two fast-sweep waves having a total repetition period equal to that of said received pulses, causing each of said fast-sweep deflecting waves to produce a cathode-ray trace and causing a pulse of each group of received pulses to appear on said two fast-sweep cathode-ray traces, respectively, changing the start of the second fast-sweep deflecting wave of said deflecting wave cycle until said received pulses on said traces are in substantially exact alignment or coincidence, causing at least one of the longer-repetition-period groups of timing pulses to produce timing marks on at least one of said slow-sweep traces whereby from the resulting timing marks an operator may determine within a certain fraction of said longer repetition period the amount that the start of said second slow-sweep wave is shifted in time with respect to said mid-point of the full deflecting wave cycle, causing at least two of said groups of timing pulses to produce timing marks on the fast-sweep trace produced by said second fast-sweep deflecting wave, causing a timing pulse from the one of said two groups having the longer repetition period to appear as a cross-hair marker on the trace produced by the first fast-sweep deflecting wave, and counting from a certain timing marker on the trace produced by said second fast-sweep wave to said cross-hair marker to determine said fractional repetition period, said certain timing marker being the first one that occurs in time sequence along the second fast-sweep trace following said cross-hair marker and which is produced by one of said longer-repetition-period pulses, said fast-sweep waves being shaped to expand the fast-sweep traces in the region of said fractional repetition period as compared with the remaining portions of the fast-sweep traces.

19. In a navigation system, receiving apparatus for measuring the time relation of one group of periodically recurring received pulses transmitted from a ground station with respect to another group of periodically received pulses transmitted from a second ground station where both groups of pulses have the same repetition period and where said groups are transmitted with a predetermined time relation, said apparatus comprising means for producing pairs of slow-sweep cathode-ray deflecting waves and for producing pairs of fast-sweep cathode-ray deflecting waves, said slow-sweep and fast-sweep waves occurring alternately and the two pairs of waves having a total repetition period equal to that of said groups of received pulses, means for producing groups of timing pulses each group having a different repetition period and having a fixed time relation to the start and finish of the cycle of said two pairs of deflecting waves, means for causing said four deflecting waves to produce four cathode-ray traces, respectively, means for causing a pulse of each group of said received pulses to appear on the two fast-sweep cathode-ray traces, respectively, means for changing simultaneously the start of the second occurring fast-sweep and slow-sweep deflecting waves of said deflecting wave cycle with respect to a predetermined point in said deflecting wave cycle until the received pulses on said traces are in alignment or coincidence, and means for causing said groups of timing pulses to produce timing marks on said traces whereby from the resulting longer-repetition-period timing marks on one of the slow-sweep traces an operator may determine within a certain fraction of said longer period the amount that the start of said second occurring waves is shifted in time with respect to said predetermined point in said deflecting wave cycle, and whereby the operator may count shorter-repetition-period timing marks on that one of said fast-sweep traces which is adjustable, said count being from a certain timing marker on the expanded portion of said adjustable fast-sweep trace to a cross-hair marker on the expanded portion of the other fast-sweep trace to determine said fractional repetition period, said certain timing marker being produced by one of said longer-repetition-period pulses, and said cross-hair marker being produced by one of the shorter-repetition-period pulses.

20. In a navigation system, receiving apparatus for measuring the time relation of one group of periodically recurring received pulses transmitted from a ground station with respect to another group of periodically received pulses transmitted from a second ground station where both groups of pulses have the same repetition period and where said groups are transmitted with a predetermined time relation, said apparatus comprising means for producing pairs of slow-sweep cathode-ray deflecting waves each starting at the same voltage level and each of identical slope and for producing pairs of identical fast-sweep cathode-ray deflecting waves, said slow-sweep and fast-sweep waves occurring alternately and the two pairs of waves having a total repetition period equal to that of said groups of received pulses, the slope of each fast-sweep wave being of decreasing steepness from at least near the start of the wave to the end of the wave, means for producing groups of timing pulses each group having a different repetition period and having a fixed time relation to the start and finish of the cycle of said two pairs of deflecting waves, means for causing said four deflecting waves to produce four cathode-ray traces, respectively, means for causing a pulse of each group of said received pulses to appear on the two fast-sweep cathode-ray traces, respectively, on their expanded portions, means for changing simultaneously the start of the second occurring fast-sweep and slow-sweep deflecting waves of said deflecting wave cycle with respect to a predetermined point in said deflecting wave cycle until the received pulses on said traces are in alignment or coincidence, and means for causing said groups of timing pulses to produce timing marks on said traces whereby from the resulting longer repetition period timing marks on one of the slow-sweep traces an operator may determine within a certain fraction of said longer period the amount that the starts of said second occurring waves are shifted in time with respect to said predetermined point in said deflecting wave cycle, and whereby the operator may count shorter-repetition-period timing marks on that one of said fast-sweep traces which is adjustable, said count being from a certain timing marker on the expanded portion of said adjustable fast-sweep trace to a cross-hair marker on the expanded portion of the other fast-sweep trace to determine said fractional repetition period, said certain timing marker being produced by one of said longer-repetition-period pulses, and said cross-hair marker being produced by one of the shorter-repetition-period pulses.

21. The invention according to claim 20 wherein said means for producing pairs of slow-sweep waves and pairs of fast-sweep waves comprises a vacuum tube having a cathode, a grid and an anode, a capacitor connected between said cathode and ground, a source of direct-current voltage connected to said anode, a second vacuum tube having a cathode, a grid and an anode, a resistor unit and a capacitor unit connected in parallel with each other, said parallel connected units being connected in series with the anode of said second tube and the cathode of said first tube, a resistor connected between said source of direct-current voltage and the cathode of said first tube, and means for applying a periodically recurring positive pulse to the grid of said first tube and for applying an immediately following periodically recurring positive pulse to the grid of the second tube to make them successively conducting, and means for holding each of said tubes non-conducting between the application of positive pulses thereto whereby fast and slow sweep deflecting waves appear alternately across said capacitor.

22. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, successively producing pairs of sequentially occurring deflecting waves which are identical throughout their useful deflecting portions, deflecting a cathode ray successively by said waves to produce two cathode ray traces, causing said A and B pulses to appear on said two traces with the A pulse on the trace that is produced by the second of said pair of deflecting waves, and adjusting the starting time of the second of said pair of deflecting waves until it is such that said A and B pulses are aligned.

23. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses as they appear at a point remote from said ground stations which comprises receiving said A and B pulses at said point, successively producing pairs of sequentially occurring deflecting waves having decreasing slope from at least near the start of the wave and which are identical throughout their useful deflecting portions, deflecting a cathode ray successively by said waves to produce two parallel adjacent cathode ray traces which are expanded at one end, causing said A and B pulses to appear on said two traces with the A pulse on the trace that is produced by the second of said pair of deflecting waves, and adjusting the starting time of the second of said pair of deflecting waves until it is such that said A and B pulses are aligned.

24. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring deflecting waves which are identical throughout their useful deflecting portions, means for deflecting a cathode ray by said waves to produce two cathode ray traces, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for indicating the amount that said starting time has been adjusted or shifted with respect to a predetermined time reference point.

25. In a navigation system wherein periodically recurring radio pulses are radiated from A and B ground stations as A and B pulses, respectively, with the B pulses occurring at a predetermined time following the mid-point of the period of the A pulses, a receiver for receiving said A and B pulses, a cathode-ray deflecting circuit for producing successively pairs of sequentially occurring deflecting waves having decreasing slope from at least near the start of the wave and which are identical throughout their useful deflecting portions, means for deflecting a cathode ray by said waves to produce two parallel adjacent cathode ray traces which are expanded at one end, means for adjusting the starting time of the second of said pair of deflecting waves, means for causing said A and B pulses to appear on said two traces with the A pulse on the trace that is produced by said second deflecting wave whereby said A and B pulses may be aligned by adjusting said starting time, and means for indicating the amount that said starting time has been adjusted or shifted with respect to a predetermined time reference point.

GEORGE D. HULST, Jr.

REFERENCES CITED

The following references are of record in the file of this patent:

UNITED STATES PATENTS

| Number | Name | Date |
| --- | --- | --- |
| 2,208,378 | Luck | July 16, 1940 |
| 2,329,137 | Richards | Sept. 7, 1943 |
| 2,345,668 | Hallmark | Apr. 4, 1944 |